Patented Apr. 27, 1926.

1,582,472

UNITED STATES PATENT OFFICE.

KIKUNAË IKEDA, OF TOKYO, JAPAN.

MANUFACTURE OF GLUTAMIC ACID AND SALTS THEREOF.

No Drawing.    Application filed January 5, 1925. Serial No. 630.

*To all whom it may concern:*

Be it known that I, Dr. KIKUNAË IKEDA, a subject of the Emperor of Japan, residing in Tokyo, Japan, have invented certain new and useful Improvements in the Manufacture of Glutamic Acid and Salts Thereof, of which the following is a specification.

The present invention is for improvements in and relating to the manufacture of glutamic acid and salts thereof, and has particular reference to the manufacture of this acid from "schlempe", a by-product of the manufacture of alcohol from beetroot molasses.

In brief, the production of schlempe consists in diluting the beetroot molasses, effecting the fermentation thereof and distilling off the alcohol. The residue in the still is then concentrated, generally to a specific gravity of 1.40, and the syrupy substance so obtained constitutes the schlempe as it usually comes upon the market. The present invention is, however, not restricted to the use of schlempe produced in a particular manner, but is applicable to any residue from beet-sugar manufacture which contains glutamic acid either as such or as part of a more complex molecule.

According to the present invention, the process for the manufacture of glutamic acid from schlempe is characterized by recovering the acid in the form of its sparingly soluble calcium salt.

Thus, the liquor may be digested with an excess of lime, whereby hydrolysis of compounds of glutamic acid, and the formation of its calcium salt is effected in a single operation. Considerable care, however, is needed in adopting this procedure, because the optically active acid is liable to be racemized if the digestion of the liquor with the lime be carried out at too high a temperature or be too prolonged. It is, therefore, preferred first to digest the schlempe with an acid hydrolytic reagent such as a mineral acid, for example, sulphuric or hydrochloric acid, and then to treat the neutralized solution with lime for the purpose of converting the glutamic acid into the calcium salt.

An alternative method is to convert the glutamic acid into the hydrochloride, and then to treat this with lime for the purpose of forming the calcium salt.

From the calcium salt, the free acid may be readily obtained, or the salt may be treated with the salt of an alkali the acid radicle of which combines with calcium to give a calcium salt insoluble, or substantially insoluble, in water.

The following is a description by way of example of the operation of the invention.

The schlempe, which, if of the usual syrupy consistency, it is desirable to dilute, is heated with sulphuric or hydrochloric acid in order to hydrolyze glutamine and like compounds and to liberate glutamic acid. The acid gives rise to humus-like substances, which are filtered off, and the liquor is then neutralized with lime.

When sulphuric acid has been used as the hydrolytic reagent, the calcium sulphate which is produced on neutralization is filtered off, and the liquor is then decolorized by means of animal charcoal, or any other suitable decolorizing agent. The liquor is then digested with an excess of lime, filtered while still warm and evaporated to low bulk, the last-mentioned procedure being most advantageously carried out under reduced pressure. On standing, crystals of the calcium salt of the bibasic glutamic acid, having the composition $C_5H_7NO_4Ca,H_2O$, gradually separate out. These crystals are collected and washed with cold water to free them from the mother liquor, this operation involving no material loss owing to the difficult solubility of the salt in cold water.

As previously stated, the glutamic acid may be initially isolated in the form of the hydrochloride. For this purpose, the liquor from the acid hydrolysis, neutralized, and freed from calcium sulphate, is evaporated almost to dryness, and then admixed with fuming hydrochloric acid in excess. On standing, glutamic acid hydrochloride, together with potassium chloride and other substances, crystallizes out. The whole crystalline mass is freed as far as possible from mother liquor, dissolved in water, the solution digested with an excess of lime, filtered warm, and the filtrate put by for crystallization. The difficultly soluble calcium glutamate, $C_5H_7NO_4Ca,H_2O$, gradually separates out, somewhat discolored, but otherwise of good commercial purity.

If hydrochloric acid has been originally used as the hydrolytic reagent, the hydrolyzed schlempe filtered from humus-like substances, is concentrated by evaporation to a syrupy condition and then left to crystallize.

It is advantageous to add some hydrochloric acid, either in the form of a concentrated solution, or as the gas. In a few days, almost the whole mass becomes crystalline, and on separating the mother liquor crude glutamic acid hydrochloride is obtained, and on decomposition with lime as previously described gives substantially pure calcium glutamate.

This modified form of procedure, whereby glutamic acid hydrochloride is prepared as an intermediate product, requires a considerable quantity of concentrated hydrochloric acid, but enables the employment of a decolorizing agent to be dispensed with, or the quantity to be reduced.

The separation of the difficultly soluble calcium glutamate may be facilitated by the addition of alcohol, the presence of which also somewhat increases the yield, and the addition of a soluble salt of calcium and some free ammonia accelerates the formation of the crystals.

In order to prepare glutamates of alkali metals, the salt of an alkali metal of the type previously mentioned is added in an equivalent quantity to the sparingly soluble calcium salt in presence of water. For instance, with bicarbonate of sodium the following reaction will take place:

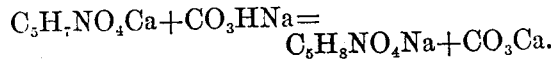

On filtering off the calcium carbonate and evaporating the solution, sodium glutamate is obtained in the crystalline state.

The readily soluble calcium salt of glutamic acid may be prepared by acting with carbon dioxide upon the difficultly soluble calcium glutamate in presence of water—

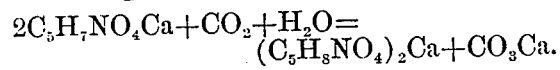

On removal of the calcium carbonate, and evaporation of the solution the more soluble calcium salt is obtained in crystalline form.

It will be appreciated that the above description is by way of example only and that the invention is not limited thereby. For instance, while I have found lime to be the most convenient reagent wherewith to effect the recovery of the glutamic acid, the equivalents of lime, such as baryta and strontia, are to be regarded as comprised by the term "lime", and as being within the scope of this invention. Also in the decomposition of the calcium salt for the purpose of obtaining glutamates of the alkali metals, there may be used in place of the bicarbonates other acid salts formed by the combination of alkalies with acids the neutral calcium salts of which are insoluble, or substantially insoluble, in water, for example, the acid oxalate of sodium.

What I claim as my invention and desire to secure by Letters Patent is:

1. The process of manufacture of glutamic acid and salts thereof from schlempe, characterized by hydrolyzing the schlempe and converting the glutamic acid into the sparingly soluble calcium salt.

2. A process according to claim 1, wherein the schlempe is digested with excess of lime, preferably at as low a temperature and with the shortest heating possible consistent with hydrolysis of the schlempe and formation of the calcium glutamate, for the purpose of avoiding, or diminishing the degree of, racemization of the active enantiomorph.

3. A process according to claim 1, wherein the schlempe is hydrolyzed with an acid hydrolytic reagent, for example, a mineral acid, the reaction liquor neutralized, filtered from precipitated matters, and then treated with lime to convert the glutamic acid into the calcium salt.

4. A process according to claim 1, wherein the glutamic acid is first converted into substantially pure hydrochloride, and the latter then decomposed by treatment with lime in order to obtain the sparingly soluble calcium glutamate.

5. In the manufacture of glutamic acid according to claim 1, the addition to the liquor containing the sparingly soluble calcium glutamate of a salt of calcium and some free ammonia, for the purpose of promoting the crystallization of the sparingly soluble salt.

6. The process of manufacture of soluble salts of monobasic glutamic acid, which consists in treating the sparingly soluble calcium glutamate obtained by a process as set forth in claim 1 with an acid salt formed by the combination of an alkali with an acid the neutral calcium salt of which is insoluble, or substantially so, in water, for instance, the bicarbonate of an alkali metal.

7. The process of manufacture of the soluble calcium salt of glutamic acid, which consists in treating the sparingly soluble calcium salt obtained by a process as set forth in claim 1 with carbon dioxide gas in presence of water.

In testimony whereof I affix my signature.

KIKUNAÈ IKEDA.